United States Patent [19]

Payne

[11] 4,041,776

[45] Aug. 16, 1977

[54] STRAIN INDICATOR

[75] Inventor: William J. Payne, Greensburg, Pa.

[73] Assignee: Modulus Corporation, Chagrin Falls, Ohio

[21] Appl. No.: 669,247

[22] Filed: Mar. 22, 1976

[51] Int. Cl.² .............................................. F16B 31/02
[52] U.S. Cl. ....................................... 73/88 F; 85/62; 116/DIG. 34
[58] Field of Search ............... 73/88 F; 116/DIG. 34; 85/62

[56] References Cited

U.S. PATENT DOCUMENTS

| 3,602,186 | 8/1971 | Popenoe | 73/88 F X |
| 3,886,840 | 6/1975 | Bossler | 73/88 F X |
| 3,908,508 | 9/1975 | Payne | 85/62 |

Primary Examiner—Charles A. Ruehl
Attorney, Agent, or Firm—Fay & Sharpe

[57] ABSTRACT

An optical indicator of the type wherein the lessening of the load on a member under strain produces movement of an indicator element. Such movement takes place when the relaxation of the member under strain has reached a certain predetermined value thereby giving an immediate visual indication of that fact.

14 Claims, 4 Drawing Figures

STRAIN INDICATOR

BACKGROUND OF THE INVENTION

This invention relates to optical indicators and more particularly to an optical indicator of the type wherein a decrease in the length of a strain member produces movement of an indicator element.

In many assembly operations where fastening devices are used it is desirable to inspect assembled fasteners to determine that they are under load and have not become loosened due, for example, to vibrations or other forces acting upon the fastener in use. The fastener may be, for example, a stud, a bolt, a rivet, or the like.

Several prior art techniques have been utilized for determining when a fastener has been properly taken up. The apparatus of this invention, however, is related to a structure for giving a visual indication of the fact that a fastener is not under load or has become loosened.

Fastener take up may be measured by determining either torque, stress or strain values in a fastener. Since torque, stress and strain are all interrelated, it is possible to determine the stress levels in a fastener knowing the strain of the fastener. Similarly, it is possible to determine torque values knowing the stress imparted to the fastener at any point. Thus, for purposes of illustration, the terms torque, stress and strain may be used interchangeably.

The device of this invention is termed a strain indicator because it is the decrease in length of the fastener that is being sensed in order to determine a decreased load on the fastener. The term strain indicator should not be considered as limiting since in its broadest sense the device of this invention may be considered a stress or torque indicator as well.

REFERENCE TO RELATED APPLICATIONS AND PATENTS

U.S. Pat. Nos. 3,799,108 and 3,850,133 and assigned to Modulus Corporation, the assignee of this application, describe fluid type strain indicators wherein the application of torque to a fastener causes movement of an indicator element in a fluid environment thus giving a visual indication of the fact that torque has been applied to the fastener. U.S. Pat. No. 3,908,508 assigned to Modulus Corporation, the assignee of this application, describes a non-fluid type strain indicator wherein a visual indication is given when the strain limit of a fastener is exceeded during take up.

SUMMARY OF THE INVENTION

Briefly summarized, the strain indicator of this invention comprises a threaded bolt having a bore extending from the bolt head into the body thereof. A pin member is received within the bore. The free end of the pin is received within an indicator assembly which itself is attached to the fastener. The indicator assembly is comprised of an indicator element, a spring, a connector element, and an adjusting sleeve.

As the fastener under stress is caused to become loosened the length of the fastener decreases. When the change in length exceeds a predetermined value the pin member is caused to contact the indicator element of the indicator assembly with the result that releasable connecting means within the indicator assembly is activated thereby releasing the indicator element and causing it to be projected out of the head of the fastener thus presenting a visual indication of the fact that the fastener is no longer under load.

BRIEF DESCRIPTION OF THE DRAWINGS

A more complete description of the invention will now be made with reference to the accompanying drawings in which.

DESCRIPTION OF THE PEFERRED EMBODIMENT

Figure 1:
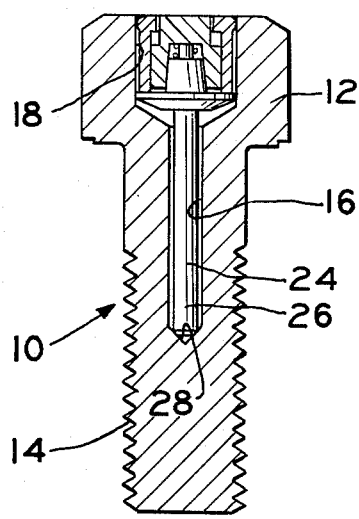
FIG. 1 is an elevational cross-sectional view of a fastener incorporating the indicating feature of this invention.

Turning now to FIG. 1 the apparatus of this invention includes fastener 10 having a head 12 and external threads 14. Head 12 may be in any desired configuration making it possible to turn the fastener with a suitable tool such as a wrench.

An axial bore 16 is drilled from the head of the fastener a substantial distance into the fastener body. A counterbore 18 is provided at the head 12 in order to receive the indicator assembly as will be described more fully hereafter.

As is shown in FIG. 1, pin member 24 is provided with a first end 26 which is adapted to be received within the bore 16 and in contact with the bottom wall 28 defined at an interior portion of the fastener at the end of bore 16. In the preferred embodiment, end 26 of pin member 24 simply rests against the bottom wall 28 and is not actually secured to fastener 10. Due to the operation of the indicator assembly of this invention as will be described more fully below it is not necessary that the first end 26 of pin member 24 be actually secured to bottom wall 28 or the wall defining bore 16. However, within the spirit of this invention, these parts may be joined together through the use of a press fit, adhesives, screw threads, or other joining techniques known to those skilled in the art.

Figure 2:
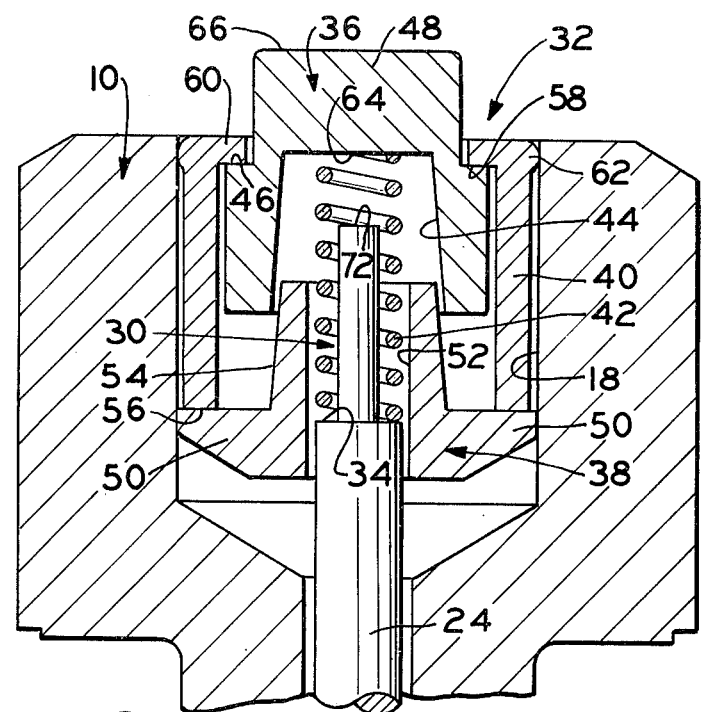
FIG. 2 is an enlarged fragmentary elevational cross-sectional view of the indicator apparatus of this invention with the fastener in an unstressed condition.
Figure 2:
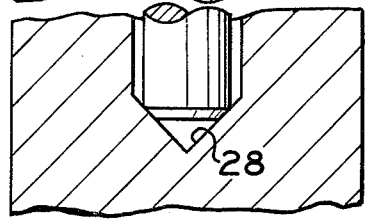

As is shown more clearly in FIG. 2, the second end 30 of pin member 24 is received within indicator assembly 32. In the preferred embodiment, end 30 is defined as a reduced diameter projection extending from pin member 24 there being defined a shoulder 34 at the intersection of the projection and the body of the pin member.

The indicator assembly of this invention is generally designated 32 in FIG. 2 and includes an indicator element 36, a connector element 38, an adjusting sleeve 40, and a coil spring 42.

Indicator element 36 is generally cup-shaped and includes an internal, generally frusto-conical surface 44, a shoulder 46, and an external surface 48 which, in the preferred embodiment, is brightly colored in order to be clearly visible.

Connector element 38 is generally annular in shape and includes a radially extending shoulder 50 which is adapted to engage the wall of the fastener head defining counterbore 18 in a press fit relationship. A bore 52 extends through connector element 38 and is adapted to accommodate pin member 24 and coil spring 42. A frusto-conical external surface 54 is defined by the connector element 38 and is adapted to be complementary to the frusto-conical surface 44 of indicator element 36.

A generally annular adjusting sleeve 40 is provided as shown in FIG. 2 with sufficient axial length such that when received in counterbore 18 sleeve 40 contacts connector element 38 and thus may be used to provide for axial adjustment of connector element 38 within counter 18 in a manner to be described further below. It will be noted in FIG. 2 that sleeve 40 is provided with a bottom wall 56 which abuts shoulder 50 of connector element 38. Sleeve 40 is also provided with an upper generally radially extending flange 60 defining a shoulder 58 which is adapted to be complementary to shoulder 46 of indicator element 36. As will be evident from FIG. 2 the engagement of the complementary shoulders 46, 58, prevents the complete removal of the indicator element 36 from the indicator assembly 32. As will be also evident from FIG. 2, flange 60 defines an opening sufficient to permit the external surface 48 of indicator element 36 to project out of the indicator assembly 32.

Adjusting sleeve 40 is, in the preferred embodiment, retained within counterbore 18 be means of a press fit although other connecting means may be employed including, but not limited to, screw threads, adhesives and other joining means well known to those skilled in the art. As will be noted in FIG. 2 a slight annular projection 62 is defined at the external surface of sleeve 40 in order to enhance retention of the sleeve within the counterbore 18.

Coil spring 42 is generally received about second end 30 of pin member 24 and is adapted to engage shoulder 34 of pin member 24 and the internal surface 64 of the indicator element 36.

In the position shown in FIG. 2 the fastener 10 is in a no load or unstressed condition and the indicator assembly 32 is in the fastener take up position. That is to say, in the position of FIG. 2 the fastener is ready to be taken up an appropriate amount.

Figure 3:
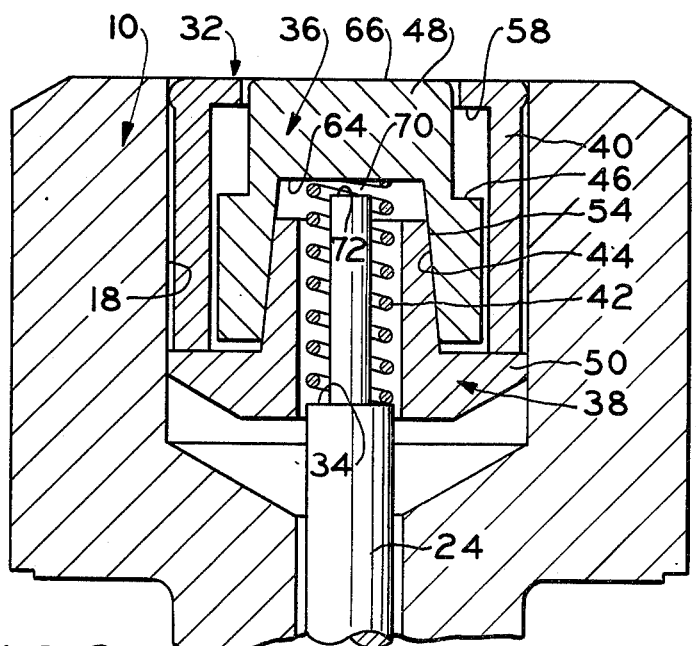
FIG. 3 is an enlarged fragmentary elevational cross-sectional view of the indicator apparatus of this invention with the fastener in a stressed condition and with the indicator assembly activated to sense a condition in which the load on the fastener should decrease.
Figure 3:
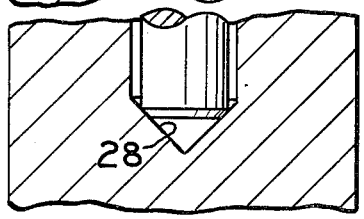

During take up of the fastener the indicator assembly is in the position shown in FIG. 2. Once the load on the fastener has been established the operator then causes the indicator assembly to become activated or set by depressing the extended indicator element from the position shown in FIG. 2 to the position shown in FIG. 3. This is accomplished by the operator simply pressing his thumb against the upper surface 66 of the indicator element and exerting a downward pressure causing the complementary frusto-conical surfaces 44, 54 to be brought into locking engagement as is shown in FIG. 3. Once the members 36, 38 are in locked engagement as is shown in FIG. 3 the operator removes thumb pressure from the indicator element 36.

In the condition shown in FIG. 3, therefore, the fastener 10 has been taken up an appropriate amount and the indicator assembly 32 has been activated or set to sense a loosened condition of the fastener as will be described below.

OPERATION OF INDICATOR

In the position shown in FIG. 3 the indicator assembly is ready to sense a loosened condition of the fastener in the following manner.

When a fastener is taken up under load its length increases as the fastener stretches. In the elastic range of fastener material a loss of the load on the fastener will cause the elongation to decrease until the fastener assumes its original unstressed length. Therefore, should the stressed fastener of FIG. 3 be caused to be loosened, th pin member 24 will move upwardly (with reference to FIG. 3) due to the fact that the bottom wall 28 (in contact with pin member 24) is caused to move upwardly. Upward movement of pin member 24 (due to decreasing load) closes the gap 70 which is defined between the internal surface 64 of indicator element 36 and upper surface 72 of pin member 24. Once surface 72 contacts surface 64 a further loss of load and, subsequently, a further upward movement of pin member 24 will cause the indicator element 36 to break away from the connector element 38 (as the locking taper at surfaces 44, 54 between these members is broken). Once free from engagement with connector element 38, the indicator element 36 will be immediately projected upwardly by means of the compressed coil spring 42 until such time as shoulder 46 of indicator element 36 contacts shoulder 58 of adjusting sleeve 40. The upward projection of the indicator element 36 (to the position shown in FIG. 2) causes the brightly colored external surface 48 thereof to be exposed thus indicating the fact that a decrease in load on the fastener has taken place. The fastener is then in a loosened condition and requires attention.

Once a visual indication has been given of the fact that the fastener is in a loosened condition an appropriate torque may be applied to the fastener to re-establish take up. The indicator may then be reset to the position of FIG. 3 in order to once again warn of a decrease in load on the fastener.

ASSEMBLY AND ADJUSTMENT OF THE INDICATOR

Since proper assembly and adjustment of the indicator of this invention are important a brief description will now be made of the preferred mode of assembly and the sequence thereof.

Assuming that the fastener 10 has initially been prepared with the bore 16 and counterbore 18 drilled, the connector element 38 is placed in counterbore 18 to a depth approximately equal to the axial length of sleeve 40. As previously indicated the connector element 38 is retained in counterbore 18 by a press fit engagement of the connector element with the wall defining counterbore 18.

After placement of the connector element 38 the pin member 24 (with coil spring 42) and indicator element 36 are loosely positioned within the fastener. Thereafter pressure is applied to surface 66 of indicator element 36 forcing this member downward until the frusto-conical surfaces 44, 54 contact one another. Further downward pressure is then applied to cause the connector element 38 to move with the indicator element 36 in a downward direction until the upper surface 72 of pin member 24 contacts the internal surface 64 of the indicator element 36. At this point in time the adjusting sleeve 40 is installed and pressed downwardly until the bottom wall 56 thereof contacts shoulder 50 of connector element 38. Once contact of sleeve 40 is made with connector element 38 a slight additional downward movement of sleeve 40 is made causing indicator element 36 to be freed from locking engagement with connector element 38 with the result that indicator element 36 is subsequently biased upwardly by means of coil spring 42. At this point in the assembly operation a zero load reference has been obtained.

Once the zero load reference point has been established sleeve 40 is caused to be moved downwardly an additional increment equal to the strain expected at the design load of the fastener. This additional increment of movement of sleeve 40 (which is based on the strain expected at design load) is equal to the axial dimension of the gap 70 as shown in FIG. 3 and may take several different values depending upon design variations in the fastener, fastener material, etc.

Once the strain increment has been imparted to the connector element 38 as described above, the fastener is then ready for use.

It should be emphasized that the sequence of assembly of the indicator of this invention permits a wide degree of flexibility and choice of load point to be built into the fastener.

To sum up, adjustment of the indicator assembly of this invention is accomplished by first causing the indicator element 36 and connector element 38 to be locked together and pressed downwardly until such time as the indicator element contacts the pin member. Thereafter the adjusting sleeve 40 is positioned in contact with the connector element 38 and a slight additional downward movement is imparted to the connector element until the indicator element 36 is separated from the connector element 38. This establishes the zero load reference point. Thereafter the sleeve 40 is moved in a downward direction an additional increment equal to the strain expected a design load. The indicator is then ready for use.

As will be appreciated from a study of the description above it is not possible to activate or set the indicator assembly by causing the indicator element 36 to become locked to the connector element 38 (at the inter-engaging tapered surfaces thereof) until such time as the fastener has been taken up an appropriate amount and the pin member 24 has been caused to move in a downward direction. If one were to attempt to set the indicator assembly with the fastener in an unloaded condition (by depressing the indicator element 36) contact would be made with the pin member 24 before such time as the corresponding frusto-conical surfaces 44, 54 engaged. It is only after take up of the fastener that a sufficient clearance or gap is provided between the pin member and the indicator element to permit the indicator assembly to be set in the configuration of FIG. 3.

ADVANTAGES OF THE INVENTION

This invention provides a reliable apparatus for determining the fact that load on a fastener has decreased in service. The spring loaded indicator assembly is triggered by positive movement of a pin member which comes about as a result of a decrease in fastener length. The visual indication is clear as the brightly colored surface 48 is caused to project out of the head of the fastener thereby giving a reliable and instantaneous optical presentation of the fact that loading on the fastener has decreased to an unacceptable level.

This invention has wide application in virtually any fastener application where it is desired to determine whether the fastener has become so loose as to constitute a safety hazard. One particular application is a fastener used in railroad rail tie plates. If these plates should become loose, rails can separate resulting in derailment. This invention makes it possible for railroad employees to verify safe conditions in the fasteners retaining railroad tie plates quickly and reliably through visual inspection and without the need for the utilization of elaborate and expensive torque apparatus at each fastener. Similar benefits can be achieved with the use of fasteners incorporating this invention in countless applications where, due to vibration and other forces acting on the fastener in use, it should become desirable to provide a means to quickly and reliably visually inspect the fastener.

MODIFICATIONS OF THE INVENTION

While the preferred embodiment has been described with reference to FIGS. 1-3 it should be appreciated to those skilled in the art that modifications and variations are possible within the scope of the invention.

Figure 4:
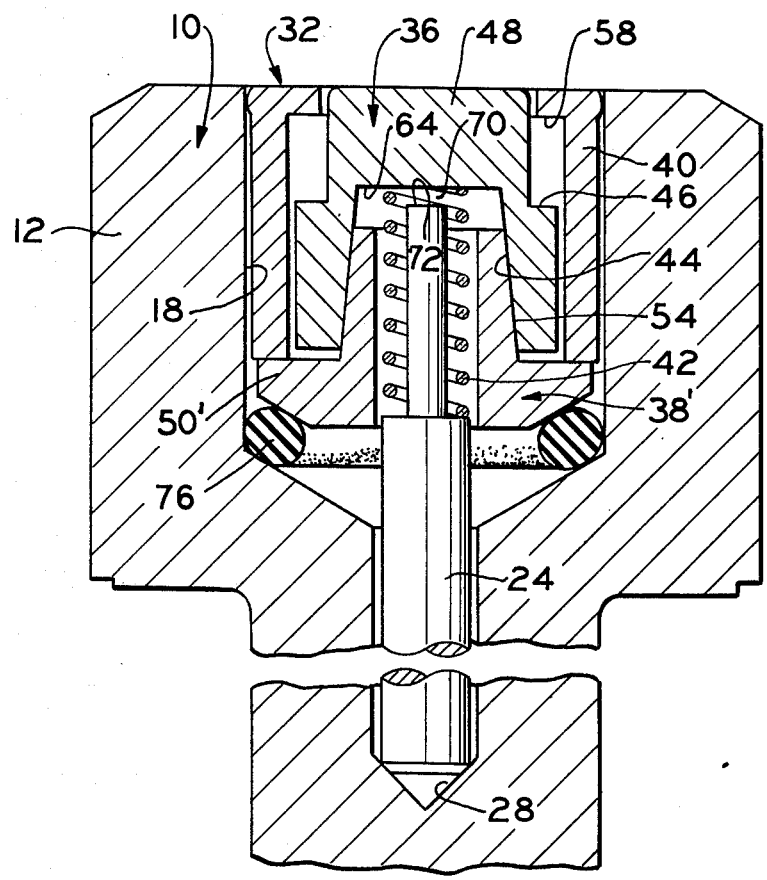
FIG. 4 is an enlarged fragmentary elevational cross-sectional view similar to FIG. 3 and showing a modified embodiment of the invention.

One such modification in shown in FIG. 4. The basic elements of the modification of FIG. 4 are identical to the elements shown and described in connection with the preferred embodiment of FIGS. 2 and 3. Accordingly, where similar elements are shown the same reference character has been used in FIG. 4 as was used in FIG. 3.

The principal difference between the embodiment of FIG. 4 and that shown in FIG. 3 is the fact that the radial shoulder 50' of connector element 38' (FIG. 4) has been shortened so that there is not a press fit relationship between the connector element 38' and the wall defining counterbore 18. In addition, the modified embodiment of FIG. 4 includes a generally elastomeric O-ring 76 disposed between the connector element 38' and the walls defining the internal cavity of the head 12. With the exception of the two changes just noted the modified embodiment of FIG. 4 is identical to the embodiment shown in FIGS. 2 and 3.

The structure of the modified embodiment of FIG. 4 adds an extra dimension in the performance of the strain indicator of this invention by eliminating what could be a problem area in connection with the operation of the embodiment of FIGS. 2 and 3. It will be recalled that the structure of FIG. 3 shows the indicator apparatus with the fastener in a stressed condition and with the indicator assembly activated or set. Assume that with the fastener and indicator in the position shown in FIG. 3 an operator should apply a downward force to the surface 66 of the indicator element 36. Such a downward force would produce an increased locking at the interengaging tapered surfaces 44, 54 since the connector element 38 is received in counterbore 18 in a press fit relationship. Should the degree of locking at the interengaging tapered surfaces 44, 54 increase, the point at which the indicator will trip (upon a lessening of the load on the fastener) will subsequently increase as a greater load will be required to be exerted on the indicator element 36 in order to break the locking taper between elements 36, 38.

The modified embodiment of FIG. 4 is adapted to overcome the problem just outlined. In FIG. 4 the connector element 38' is freely received within the recess of the bolt head without a press fit engagement. When the indicator is set as shown in FIG. 4 the connector element 38' is supported by the elastomeric O-ring 76 disposed between the connector element 38' and the walls defining the recess of the bolt head. In the event that an operator should inadvertently depress the indicator element 36 (FIG. 4) the downward force would be absorbed by the resilient O-ring 76. The locking taper between the surfaces 44, 54 will not increase in a manner so as to change the force level at which the indicator is activated.

Within the spirit of this invention other means to exert a resilient bias against the connector element 38' of FIG. 4 may be used including, but not limited to, one or more coil springs or other such resilient means.

While the connector element 38 and adjusting sleeve 40 are, in the preferred embodiment, defined as a pair of elements press fitted into the counterbore 18 of the fastener head, these elements can be defined as a single unit.

As a still further modification it may be desirable to define the frusto-conical surface 54 directly in the fastener head without providing for a separate connector element 38. In such a configuration, however, the adjustment flexibility of the indicator assembly would be somewhat decreased from that shown in the preferred embodiment.

The bias means, which is shown in the preferred embodiment as coil spring 42, may take several different forms including, but not limited to, a leaf spring, or other such spring apparatus. Indeed it is possible to eliminate the bias means altogether since pin movement in an upward direction will result in upward movement of the indicator element thereby giving a visual indication of the fact that loosening of the fastener has taken place. Needless to say, however, the presence of the bias means enhances the visiblity of the indicator element causing it to extend upwardly a distance a great deal in excess of upward movement of the pin member.

While in the preferred embodiment the indicator assembly is designed to trip at a predetermined decrease in load it can be appreciated that this trip point can be controlled over a wide range of loading depending upon the dimension of the gap or clearance 70. Indeed in some applications the gap or clearance may be eliminated altogether and the indicator assembly utilized in such a manner that any loosening of the fastener will produce a visual indication of a loss of load.

What is claimed is:

1. An optical indicator comprising in combination:
   a first member subject to stress-strain and having a head and a recess extending from said head into said member;
   an internal surface within said first member;
   an indicator element;
   releasable connecting means operatively fixing said indicator element relative to said first member at such time as said first member has been placed under load;
   said internal surface being movable relative to said indicator element as a function of the stress applied to said first member, there being at least a load position of said internal surface and a decreased load position;
   said indicator element being released relative to said first member as a result of contact of said releasable connecting means and said internal surface as said internal surface moves from a load position to a decreased load position;
   bias means to move said indicator element relative to said first member upon release of said releasable connecting means;
   movement of said indicator element relative to said first member providing a visual indication of the fact that said first member has reached a condition of decreased load.

2. The invention of claim 1 in which said releasable connecting means is defined as interengaging, generally frusto-conical surfaces, one surface defined at said indicator element and the other surface defined by a connector element fixed relative to said first member.

3. The invention of claim 2 in which said connector element is disposed in said first member in a press fit relationship to the wall defining said recess.

4. The invention of claim 2 in which said connector element is disposed in said first member and is fixed relative to said first member by retention means.

5. The invention of claim 4 in which said retention means is defined by sleeve means in contact with said first member and support means.

6. The invention of claim 5 in which said support means is defined by a bias member.

7. The invention of claim 6 in which said bias member is defined by an elastomeric member.

8. The invention of claim 1 in which the indicator element is disposed within an indicator assembly, said indicator assembly having a viewing area such that with said assembly fixed relative to said first member said viewing area is visible.

9. The invention of claim 8 in which said indicator assembly is defined by a generally annular sleeve and a connector element.

10. The invention of claim 9 in which said releasable connecting means is defined as interengaging generally frusto-conical surfaces, one surface defined by said indicator element and the other surface defined by said connector element.

11. The invention of claim 10 in which said indicator assembly is fixed relative to said first member by means of a press fit engagement of said sleeve and said first member.

12. The invention of claim 1 in which said internal surface is defined by a second member received within said first member and having a first end and a second end, said first end of said second member being in contact with an internal wall of said first member and said second end of said second member defining said internal surface.

13. The invention of claim 1 in which there is provided a clearance space between said releasable connecting means and said internal surface at such time as said first member has been placed under load, the dimension of said clearance space being equal to the strain anticipated in said first member at design load.

14. An optical indicator comprising in combination:
   a first member subject to stress-strain and having a head and a recess extending from said head into said member;
   a second member received within said first member and having a first end and a second end, said first end being adapted to be contacted by an internal wall of said first member;
   an indicator assembly having a viewing area, said indicator assembly being fixed relative to said first member with said viewing area substantially adjacent said head so as to be visible;
   an indicator element disposed within said indicator assembly;
   said indicator assembly being defined by a generally annular sleeve and a generally annular connector element;
   releasable connecting means operatively fixing said indicator element within said indicator assembly;
   said releasable connecting means being defined as interengaging, generally frusto-conical surfaces, one surface defined at said indicator element and the other surface defined at said connector element;

said second end of said second member being received by said indicator assembly, the relationship of said first member, said second member, and said indicator element being such that after take up of said first member there is defined a clearance space between said second end of said second member and said indicator element; whereby a loosening of said first member causes said second end of said second member to contact said indicator element thereby releasing said releasable connecting means and causing said indicator element to move relative to said first member producing an optical indication of the fact that said first member is under decreased load.

* * * * *